Figure 6:
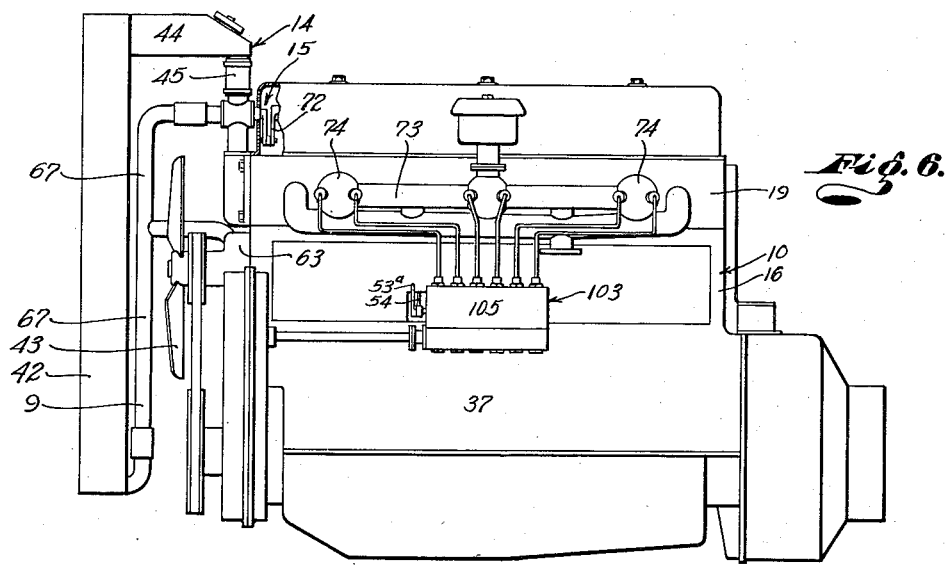

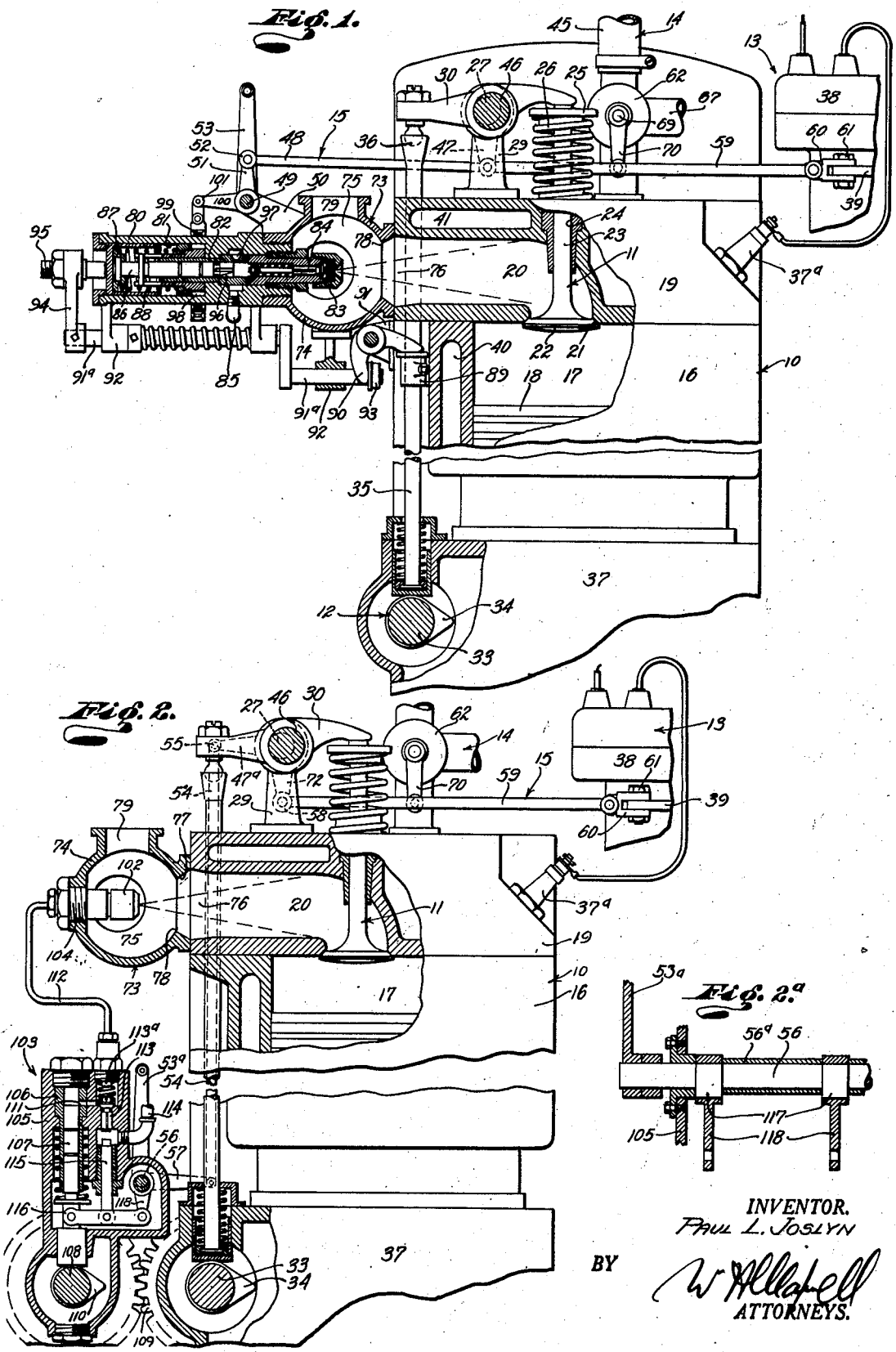

Dec. 29, 1942.  P. L. JOSLYN  2,306,733
INTERNAL COMBUSTION ENGINE
Filed Oct. 14, 1939    3 Sheets-Sheet 2
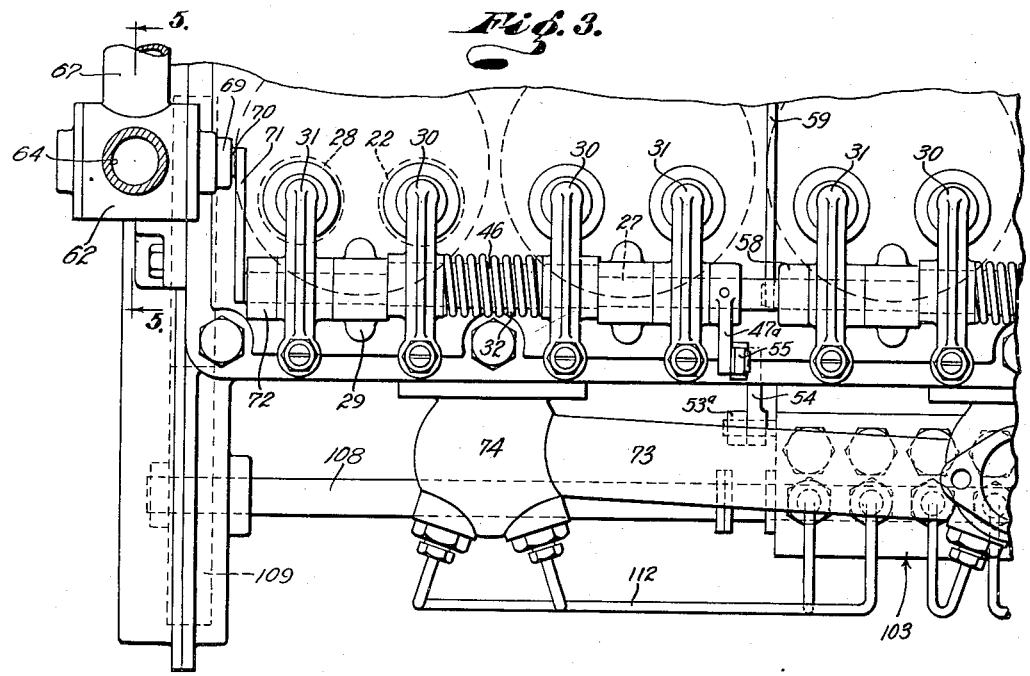
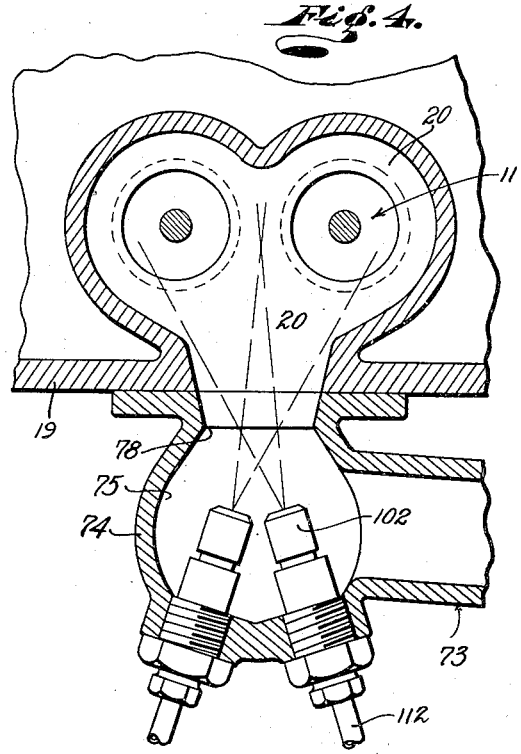
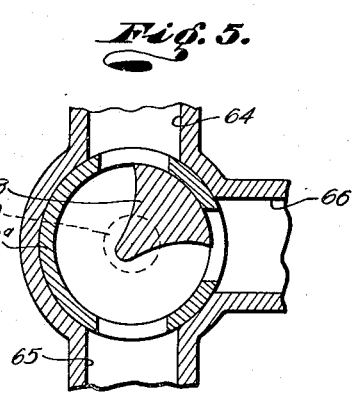
Inventor
PAUL L. JOSLYN
By
His Attorney Dec. 29, 1942.    P. L. JOSLYN    2,306,733
INTERNAL COMBUSTION ENGINE
Filed Oct. 14, 1939    3 Sheets-Sheet 3

Inventor
PAUL L. JOSLYN
By
His Attorney

Patented Dec. 29, 1942

2,306,733

UNITED STATES PATENT OFFICE 2,306,733

INTERNAL COMBUSTION ENGINE

Paul L. Joslyn, San Francisco, Calif.

Application October 14, 1939, Serial No. 299,476

2 Claims. (Cl. 123—1)

This invention relates to engines and relates more particularly to internal combustion engines of the class wherein charges of fuel and air are subjected to relatively low compression pressures and are fired by electrical ignition, or the like. A general object of this invention is to provide an engine of the class referred to that is highly efficient in operation and that may employ low grade inexpensive fuels.

This application is filed as a continuation in part of my application for Letters Patent Serial No. 259,994, filed March 6, 1939.

The present invention is concerned with internal combustion engines of the type that operates at low compression pressure, prepares its firing charges of air and fuel outside the combustion chambers and admits the charges to the cylinders during the intake strokes to be fired by electrical ignition. This class of engine is characterized by the preparation of fuel charges outside the cylinders by means of a carburetor and the admission of the charges to the cylinders during the full periods the intake valves are open. The regulating means of the carburetor usually consists of a butterfly valve in the air inlet and fuel jets whose controls are operatively interconnected with the butterfly valve so that the butterfly valve and the jet valves are simultaneously controlled. It is customary to arrange the carburetor at the inlet end of the intake manifold where it is quite distant from the cylinders and to provide the manifold with branches of varying lengths for delivering the fuel charges to the cylinders. With this usual arrangement the fuel mixture enters the cylinders in unequal amounts and there is a substantial loss of efficiency because of the unequal distribution of the fuel. The manner of preparing the fuel charges in the carburetor and the long manifold passages required to convey the fuel mixture from the carburetor to the cylinders makes it necessary to employ a rich, highly volatile fuel such as gasoline and internal combustion engines employing the conventional forms of carburetors are "one grade fuel engines," that is, they can employ only gasoline, or its equivalent.

Engines known as Diesel engines have been introduced and are widely used in large units because they are suited for the use of low grade fuel of high heat value. In Diesel engines the fuel is directly injected into the cylinders or valve chambers in an atomized state and the engine output is regulated by varying the quantity of the fuel thus admitted. The fuel charges are ignited by bringing the compression pressures to a sufficiently high point to produce self-ignition of the atomized fuel. These high compression pressures for igniting the fuel require that the engine be of very heavy and expensive construction. Further, the use of the high compression prevents effective high speed operation and reduces the flexibility or regulative ability at low speeds. Diesel engines, while successful in certain classes of large installations are not commercially practical or operatively successful in smaller units or in installations where high speeds and wide ranges of speed change are required.

Another object of this invention is to provide an improved internal combustion engine having the low production cost advantage and the high speed and wide speed range capabilities of the low compression type engine and the capability of effectively utilizing low grade fuels such as Diesel fuel, kerosene, stove oil, etc. The engine of the present invention or a typical engine equipped with the elements of the invention is capable of successful efficient operation with low grade fuels such as employed in Diesel engines and yet operates with low compression to have the advantages of the type of engine that heretofore has been restricted to the use of expensive, high grade, volatile fuels.

Another object of this invention is to provide novel means suitable for embodiment in or application to an internal combustion engine of the low compression type that adapts the engine for the successful and efficient use of fuels such as kerosene, stove oil, Diesel oil, etc.

Another object of this invention is to provide an improved fuel handling means or carbureting means for embodiment in or application to engines of the low compression type that adapts the engine for the economical and successful use of low grade fuels without altering the basic principle of engine operation.

Another object of this invention is to provide improved and particularly effective means for regulating an internal combustion engine.

Another object of this invention is to provide an engine of the character referred to embodying means for relating and controlling the intake valves and the fuel delivering means to obtain the most efficient operation under all loads and at all speeds.

Another object of this invention is to provide an internal combustion engine embodying a novel control system or control means in which the intake valve or valves form regulating elements and are interconnected with the fuel delivering means or pump means, the ignition control and, if desired, with a means for the control of the cooling medium to assure the related action and control of these elements for the most effective operation.

Another object of this invention is to provide an internal combustion engine of the character referred to embodying novel and highly effective carburetion means including an injector of improved design and operation arranged in an intake manifold of special formation and related to the intake valve to produce the most advantageous admixture of the air and atomized fuel adjacent the intake valve and in the heated valve chamber, eliminating condensation of the fuel and assuring uniform action under all conditions of operation.

Another object of this invention is to provide an engine of the character referred to embodying novel means for effectively regulating the intake valve so that the valve acts as a control element or regulating element of the engine.

A further object of this invention is to provide means attachable to previously constructed engines that improves the engine operation and adapts the engine for the use of lower grade fuels which means eliminates the usual carburetor, counteracts the inefficiency in leading the firing charges through the long intake manifold, and includes improved fuel ejecting means and novel regulating means for the intake valves, the ignition system and cooling system.

The various objects and features of my invention will be fully understood from the following detailed description of typical preferred forms and applications of the invention, throughout which description reference is made to the accompanying drawings, in which:

Fig. 1 is a fragmentary end view of an engine embodying one form of construction of the present invention with portions broken away to illustrate certain elements of the invention in vertical cross section. Fig. 2 is a view similar to Fig. 1 illustrating another form of the invention. Fig. 2ª is a fragmentary vertical sectional view of the pump shown in Fig. 2. Fig. 3 is a fragmentary plan view of an engine of the type shown in Fig. 2. Fig. 4 is an enlarged fragmentary horizontal detailed sectional view of the construction shown in Fig. 3 illustrating the manifold, the injection nozzles and the valve chamber. Fig. 5 is an enlarged fragmentary vertical detailed sectional view taken as indicated by line 5—5 on Fig. 3. Fig. 6 is a reduced side elevation of an engine embodying the features of the invention illustrated in Figs. 2, 3, 4 and 5, and Fig. 7 is a view similar to Fig. 2 illustrating another embodiment of the invention.

The present invention may be embodied in or applied to internal combustion engines varying considerably in design and construction and the invention may be varied to suit different applications. In the following detailed description I will describe several typical forms and applications of the invention, it being understood that the invention is not to be construed as limited or restricted to the specific details herein set forth.

The invention, considered broadly, may be said to comprise, in addition to other elements, the following:

Means for controlling the intake valves of an engine to vary their strokes, means for injecting fuel into the intake valve chambers, means for regulating the injecting means in a given manner relative to the action of the intake valve, and means for governing the ignition system and the cooling system of the engine in a given manner relative to the valve action. The several forms of the invention illustrated in the drawings each include this combination of means, but vary in the nature and details of certain of these and other elements. Where corresponding elements are employed in different embodiments of the invention corresponding reference numerals are applied, and where the parts and mechanisms are substantially identical there is no need for the repetition of detailed descriptions of the several elements in the several forms.

Figs. 1 to 6, inclusive, illustrate manners of applying the invention to an internal combustion engine of the valve-in-head type and are identical insofar as the control of the intake valves, the ignition means and the cooling system is concerned. The structures of Fig. 1 and Figs. 2 to 6 differ, however, in the means for supplying or injecting the fuel into the intake valve chambers.

The engine means of the invention of Fig. 1 and Figs. 2 to 6, inclusive, insofar as they are alike, may be said to comprise, generally, a cylinder block and head assembly 10, intake valves 11 in the head of the assembly 10, means 12 for operating the valves 11, an ignition system 13, a cooling system 14, and a control means 15 for varying the action of the valves 11, the ignition system 13 and the cooling system 14.

The cylinder block and head assembly 10 may be typical or conventional and the invention is concerned with its details only insofar as they are related to the other elements of the invention. The cylinder block 16 of the assembly has one of more cylinders 17 in which the usual pistons 18 operate. The head 19 of the assembly 10 has valve ports or valve chambers 20 for the admission of the fuel charges to the cylinders 17 and has similar ports (not shown) for the exhaust from the cylinders. In accordance with the usual practice the valve chambers 20 have their outer ends at a side of the head 19 and have inner ends opening downwardly at the under side of the head 19 to communicate with the upper ends of the cylinders 17.

The intake valves 11 govern the admission of the fuel charges to the cylinders 17 and cooperate with annular downwardly facing seats 21 at the inner ends of the chambers 20. The valves 11 may be of conventional construction, each comprising a head 22 for cooperating with a seat 21 and a stem 23 extending upwardly from the head 22. The valve stems 23 pass through openings 24 in the head 19 to project from the top of the head. The upper ends of the valve stems 23 are formed for engagement by the usual rockers, to be later described, and have heads or washers 25. Springs 26 are arranged under compression between the upper surface of the cylinder head 19 and the washers 25 and serve to normally close the valves 11 against the seats 21.

The means 12 for operating the valves 11 serves to operate both the intake valves 11 and exhaust valves 28. The means 12 includes a substantially horizontal shaft 27 spaced above the cylinder head 19. The shaft 27 is turnably supported by a plurality of spaced posts or bearings 29 projecting from the head 19. Rockers 30 for the operation of the intake valves and similar rockers 31 for operating the exhaust valves 28 are supported by the shaft 27. The inner arms of the rockers 30 and 31 are engageable with the upper ends of the related valve stems to depress or open the valves. The rockers 30 and 31 are free to pivot on their individual axes but are held against endwise movement along the shaft 27. The parts are related so that the rockers 30 and 31 are engageable against the ends of adjacent bearings 29 and are urged or held against the bearings by springs 32 or by elements secured to the shaft 27.

A part or element driven by the engine operates or pivots the individual rockers 30 and 31 to operate the valves 11 and 28 in the proper time sequence. In accordance with the usual practice this valve operating part is a cam shaft 33 suitably driven by the engine. The shaft 33 carries cams 34. Push rods or operating rods 35 have suitable ball and socket engagement 36 with the outer arms of the rockers 30 and 31. The rods 35 extend inwardly or downwardly at one side of the cylinder and head assembly 10 and enter the case 37 to be operated by the cams 34.

The ignition system 13 includes suitable spark plugs 37a secured in openings in the cylinder head 19 and arranged to ignite the fuel charges in the cylinders 17. A distributor 38 of suitable design is operated by a moving part of the engine and serves to control the delivery of current to the spark plugs 37a. The distributor 38 has a movable control part 39 adapted to be shifted to advance or retard the spark action. It is to be understood that the ignition system 13 is supplied with electrical energy by a battery or other means and that the distributor 38, the plugs 37a and the other parts of the system may be of selected or conventional construction.

The cooling system 14 preferably, though not necessarily, employs a liquid cooling medium such as water to prevent excessive heating of the engine. The cooling system 14 includes water jackets or spaces 40 and 41 formed in the cylinder block 16 and the cylinder head 19, respectively. The system 14 further includes a radiator 42 handling the cooling medium and a fan 43 driven by the engine to provide air movements to facilitate the cooling of the engine and the movement of the air through the radiator 42. The radiator 42 has the usual tank or container 44 at its upper end and a hose 45 communicating with the tank 44. The hose 45 is in communication with the jackets or spaces 40 and 41 in the assembly 10. An element of the control means 15 is interposed between the hose 45 and the jacket spaces of the assembly 10. A hose 9 extends from the lower end of the radiator 42 to the circulating pump 63 which is arranged to deliver the cooled water to the engine.

The control means or regulating means 15 is an important feature of the invention and serves to regulate the intake valves 11, the ignition system 13, the cooling system 14 and the fuel injecting means to effect the most efficient engine operation. The means 15 includes cams or eccentrics 46 secured to or formed on the rocker shaft 27. The eccentrics 46 carry or support the rockers 30 which operate the intake valves 11. The portions of the shaft 27 supporting the rockers 31 of the exhaust valves and the portions of the shaft supported in the bearings 29 are concentric with the longitudinal axis of the shaft. The shaft 27 is turnable to change the setting or position of the cams 46 and thus vary the stroke of the valves 11. The eccentrics 46 are of like contour and have the same setting or rotative position so that turning of the shaft 27 effects simultaneous and identical regulation of the several intake valves 11.

In the structure illustrated in Fig. 1 of the drawings the means for turning the shaft 27 to regulate the intake valves 11 includes an arm 47 fixed to the shaft 27 and a link 48 pivotally connected with the arm 47. A shaft 49 is turnably supported by a suitable bracket 50 and an arm 51 is fixed to the shaft 49. A pivotal connection 52 connects the outer end of the link 48 with the arm 51. An operating lever 53 is fixed to the shaft 49 and any suitable remote manual or automatic control may be associated with the lever 53 to operate the regulating means 15. It will be seen that operation or movement of the lever 53 produces turning of the rocker shaft 27 and that this turning of the shaft 27 changes or regulates the stroke or action of the intake valves 11.

In Figs. 2 to 6, inclusive, of the drawings the means for turning the shaft 27 to regulate the action of the intake valves 11 includes an arm 47a fixed to the shaft 27. The base or collar portion of the arm 47a is preferably arranged adjacent a rocker 30 or 31 to hold the rocker against axial movement in one direction. A rod 54 is arranged in a generally upright position at one side of the block and head assembly 10 and has its upper end pivotally connected with the arm 47a at 55. A turnable shaft 56 associated with the fuel injecting means to be later described carries an arm 57. The arm 57 is fixed to the shaft 56 and its outer end is pivotally connected with the rod 54. An operating lever 53a is fixed to the shaft 56 and manual or automatic remote control means of selected form may be connected with the lever 53a to turn the shaft 56. It will be seen that turning of the shaft 56 produces axial movement of the rod 54 and turning of the rocker shaft 27 to vary or change the stroke of the several intake valves 11.

The regulating means 15 further includes a mechanism interconnecting the control part 39 of the distributor 38 with the valve regulating means described above. This interconnection may include an arm 58 suitably fixed to the rocker shaft 27 (see Fig. 3). The collar portion of the arm 58 may be positioned at an end of one of the rockers 31 to hold the rocker against endwise movement in one direction. A link 59 is pivotally connected with the arm 58 and the outer end of the link carries a pivoted yoke 60. The pivoted yoke 60 receives the distributor control part 39 and a pivot pin 61 arranged at right angles to the pivotal axis of the yoke 60 pivotally connects the yoke to the control part 39. When the control lever 53 or 53a is operated to turn the rocker shaft 27 the interconnection just described transmits movement from the shaft to the control part 39 of the distributor 38 so that the distributor 38 is regulated simultaneously with the regulation of the intake valves 11. The control part 39 may be connected with the commutator of the distributor so that its movement produces advancement or retardation of the spark depending upon the direction of movement of the operating lever 53 or 53a.

The control or regulating means 15 further includes a valve 62 governing the cooling system 14. The valve 62 is operable by the regulating means 15 to divert or by-pass the water or a portion of the water leaving the cylinder and head assembly 10 to the suction side of the water circulating pump 63 so that this water re-enters the engine without passing through the radiator 42. The valve 62 thus governed by the control means 15 serves to keep the engine at correct temperatures for all load and speed conditions. The valve 62 has a port 64 communicating with the hose 45 and an opposed port 65 communicating with the water circulating system of the cylinder block and head assembly 10. The valve 62 further includes a by-pass port 66 spaced between the ports 64 and 65. A line or hose 67 extends from the port 66 to the suction side of the pump 63. A bushing or cylinder 63ª lines the valve 63 and a valve member 68 is turnable in the cylinder to control its pitched ports and thus regulate and proportion the water flow through the several ports. The member 68 has an operating stem 69 projecting from the valve 63. The member 68 is operable to divert varying quantities of water from the engine port 65 to the pump port 66 and may close off the by-pass port 66.

The valve member 68 has an operative interconnection with the rocker shaft 27 and the means for regulating the shaft. This interconnection comprises a lever 70 fixed to the valve stem 69 and a link 71 pivotally connected with the lever 70. An arm 72 is fixed to the outer end of the rocker shaft 27 and the outer end of the link 71 is pivotally connected with the arm 72. Upon operation of the lever 53 or 53ª the shaft 27 is turned as above described and the linkage 70—71—72 produces turning or movement of the valve member 68. The valve member 68 is set and related to the other elements so that there is a full circulation of water through the radiator 42 at full load and full or partial diversion of the heated water through the hose 69 to the pump 63 at lighter loads.

The engine structures illustrated in Fig. 1 and Figs. 2 to 6, inclusive, each include an intake manifold 73 suitably secured to the cylinder head 19. The manifold 73 has spaced generally spherical enlargements 74 whose interiors form generally spherical chambers 75. The intake chambers or valve chambers 20 of the head 19 are formed and related so that the chambers 20 of each pair of adjacent cylinders 17 are in communication and each of these pairs of communicating chambers 20 has a common inlet or mouth 76. The manifold chambers 75 have ports 77 communicating with these inlet chamber mouths 76. The mouths 76 are flaring, that is, they have outwardly diverging walls. The walls of the ports 77 are inwardly divergent relative to the chambers 20 and join the flaring walls of the mouths 76. The diverging walls of the ports 77 joint the walls of the spherical chambers 75 at Venturi tube restrictions 78. One or more of the chambers 75 of the manifold 73 have air admitting openings 79.

The fuel injecting means of the structure illustrated in Fig. 1 comprises a combination fuel pump and nozzle means for each intake valve 11 of the engine. Each of these units includes a body 80 suitably secured to the manifold 73. In the preferred construction each body 80 has an end portion threaded into an opening in the wall of an enlargement 74. Each body 80 has a longitudinal opening 81 carrying a cylinder 82. The cylinders 82 project from the bodies 80 to enter the manifold chambers 75 and in accordance with the invention the cylinders or the projecting parts of the cylinders are directed toward their respective intake valves 11. Nozzles 83 are provided on the projecting ends of the cylinders 82 to discharge funnel-shaped streams of atomized fuel of annular transverse cross section. Spring held valves 84 control the discharge from the nozzles 83. Perforated atomizing discs 83ª are clamped between the ends of the cylinders 82 and the nozzles 83. A fuel supply line 85 communicates with a port in the wall of each cylinder 82. Plungers 86 are operable in the cylinders 82 to inject fuel from the nozzles 83 at high pressures to effect the full atomization of the fuel. Tappets 87 are provided at the outer ends of the plungers 86 and springs 88 cooperate with the tappets 87 to return the plungers 86 following their active strokes.

The means for operating the plungers 86 of the fuel pumps comprise collars 89 adjustably fixed to the related valve lift rods 35 and rockers or bell cranks 90 suitably pivoted on brackets 91 on the side of the cylinder block 16. The inner arms of the bell cranks 90 are engaged by the collars 89 on the rising and falling rods 35. A stepped or offset axially shiftable rod 91ª is supported by brackets 92 depending from each pump body 80. Collars 93 are secured to the inner ends of the rods 91ª and are engaged by the outer arms of the bell cranks 90. The outer ends of the rods 91ª carry laterally projecting fingers 94 provided with adjustable push rods 95 which contact the tappets 87. It will be seen that with each operation of a valve rod 35 the related fuel pump is actuated to discharge fuel into the valve chamber 20. The annular tapering fluid spray discharging through the Venturi tube restriction 78 induces a flow of air through the chamber 75 into the chamber 20 and this air is effectively mixed with the fully atomized fuel. It is to be observed that the nozzles 83 are positioned in the manifold chambers 75 to be outside of but immediately adjacent the valve chambers 20. The atomized fuel is thus immediately or directly delivered to the heated intake valve chambers 20 and is mixed with the air as it discharges through the Venturi tube restrictions 78.

In accordance with the invention the fuel injecting pump units just described are regulable and are controlled or regulated by the means 15. The means for regulating the fuel injecting pumps include pitched faces 96 on the inner ends of the plungers 86 operable to control ports 97 which admit fuel from the line 85 to the cylinder 82. By turning the plungers 86 the faces 96 control the ports 97 to provide for the discharge of varying quantities of the fuel. The regulating means of the pumps further include rotatable gears 98 surrounding the cylinders 82 and connected with the inner projecting ends of the plungers 86. Racks 99 slidably pass through openings in the bodies 80 to mesh with the gears 98. Upon operation of a rack 99 the related gear 98 and plunger 86 are turned so that the face 96 on the end of the plunger is adjusted or turned relative to its port 95. The racks 98 are interconnected with the shaft 49 described above. The shaft 49 has spaced levers 100 and links 101 connect the levers 100 with the racks 99. Upon operation of the lever 53 the several racks 99 are simultaneously shifted in an identical manner to simultaneously regulate or change the setting of the several injection pumps. Thus the means 15 serves to regulate or control the injection pumps of the engine.

Referring now to Figs. 2 to 6, inclusive, of the drawings, the fuel injecting means comprises nozzles 102 arranged in the manifold chambers 75 and fuel pump means 103 supplying fuel charges under pressure to the nozzles 102. The nozzles 102 may be screwed in openings 104 in the wall of the manifold enlargements 74 to discharge well within the chambers 75 and to be directed toward their respective valves 11. The nozzles 102 are constructed to deliver sprays of the same character as the nozzles 83. The sprays from the nozzles 102 pass centrally through the restrictions 78 to induce air into the valve chambers 20 and to cause a full admixture of the air with the vaporized fuel.

The fuel pump means 103 is preferably in the form of a multiple pump comprising a body 105 secured to the engine case 37 to be in adjacent relation to the cam shaft 33. The pump body 105 has a series of openings each provided with a cylinder 106. Plungers 107 operate in the cylinders 106 and their lower ends project from the cylinders. A shaft 108 is rotatably supported in the pump body 105 below the plungers 107 and is rotated in timed relation to the cam shaft 33 by suitable gearing 109. Cams 110 are fixed to the shaft 108 to operate the plungers 107. The cams 110 are set to operate the plungers 107 in timed sequence and in a given timed relation to the operation of the valves 11.

The pump means 103 is regulable and is controlled by the means 15 to supply fuel charges of varying quantities to the nozzles 102. Each cylinder 106 has a lateral port 111 communicating with a pipe 102 which delivers the fuel under pressure to the related nozzle 102. Spring held discharge valves 113a control communication between the ports 111 and the pipes 112. Spring held valves 113 control communication between the cylinder ports 111 and fuel supply channels 114a supplied with fuel by supply lines 114. The valves 113 and 113a are normally closed. Push rods 115 are shiftable in the pump body 105 and are engageable with the valves 113 to unseat or open the same. The means for regulating the pump means 103 includes links 116 pivotally connected with the plungers 107. The valve opening rods 115 have free pivotal connections with the links 116 at points between the ends of the links. Regulable or adjustable means support the outer ends of the links 116 to vary the strokes of the rods 115 as imparted to them by the links. The shaft 56 has eccentrics 117 which carry lever arms 118. Spacers 56a retain the lever arms 118 on the eccentrics 117. The outer ends of the links 116 are pivotally connected with the lever arms 118. When the lever 53a is operated the shaft 56 is turned so that its eccentrics 117 raise or lower the links 116. With the links 116 in the lowermost position there is a full discharge from each cylinder 106. With the links 116 in the highest position there is a minimum discharge from the cylinders 106. It is to be observed that the intake valves 113 as controlled by the regulable rods 115 serve to by-pass the fuel under pressure from the cylinders 106 to terminate the delivery of the fuel to the nozzles 102 without previously varying or lessening the pressure on the fuel supplied to the nozzles. The eccentrics 117 on the shaft 56 are in corresponding rotative positions so that the several pump units of the means 103 are simultaneously regulated in a like manner.

Figure 7:
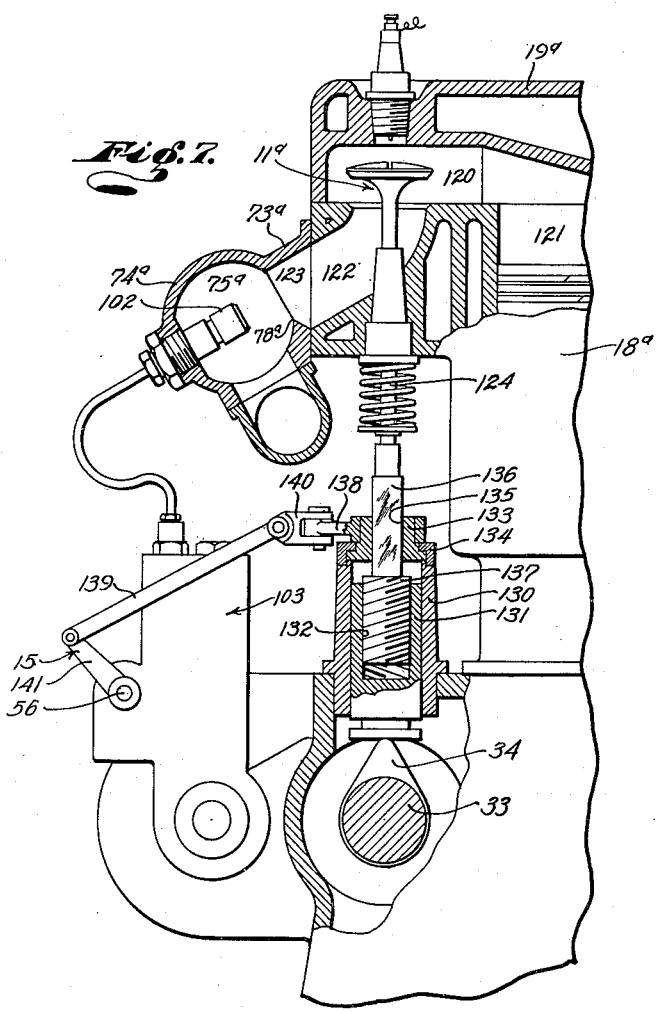

Fig. 7 of the drawings illustrates one manner of embodying the present invention in an internal combustion engine of the L-head type. In an engine of this type the head 19a has intake ports 120 joining the upper ends of the cylinders 121 and the cylinder block 18a has downwardly and outwardly sloping ports 122 extending from the ports 120 to the side of the block. The manifold 73a of the invention is applied to the side of the block 18a and has ports 123 joining the ports 122. The spherical chambers 75a of the manifold 73a have Venturi type restrictions 78a where they join the ports 123. The engine includes intake valves 11a which cooperate with seats on the top of the block 18a to control communication between the ports 122 and 120. The stems 124 of the valves 11a pass downwardly through the block 18a and are operated by the cams 34 on the cam shaft 33. The valve stems 124 and the push rods associated with the same will be later described in detail.

The nozzles 102 of the fuel injecting means are threaded in openings in the walls of the manifold enlargements 74a. The nozzles 102 are directed to discharge longitudinally and centrally through the Venturi restriction 78a and the ports 123 and 122 toward the valves 11a. A pump 103 supplies charges of fuel under pressure to the nozzle 102. The pump 103 may be the same as in the engine structure illustrated in Figs. 2 to 6, inclusive. The ignition system, the cooling system, and the pump 103 may be controlled by the means 15 in the same manner as in the embodiment of the invention disclosed in Figs. 2 to 6, inclusive.

In this form of the invention means are associated with the push rods of the valves 11a to regulate the strokes of the valves so that the valves operate as throttling elements for the engine. The regulating means for the valves 11a include guides 130 mounted on the engine case 37 and tappets or lower members 131 slidable in the guides 130 are engaged by the cams 34. Sockets 132 enter the upper ends of the members 131. Turnable sleeves 133 are arranged on the upper ends of the guides 130 and are secured against vertical movement by retainers 134. The sleeves 133 have flat walled openings 135 slidably passing flat sided stems 136. The stems 136 form parts of the push rods for the valves 11a and are provided at their lower ends with enlargements 137. The enlargements 137 are threaded in the sockets 132. The threads on the walls of the sockets 132 and on the enlargements 137 are of a steep pitch.

Interconnections are provided between the sleeves 133 and the engine control means 15 whereby the means 15 is operable to turn the sleeves and thus vary the stroke of the valves 11a. These interconnections include lever arms 138 fixed to the sleeves 133 and links 139 connected with the lever arms 138 by universal joints 140. The outer ends of the links 139 are pivotally connected with lever arms 141 fixed on the shaft 56. By operating or turning the lever 53a of the means 15 the shaft 56 is turned to operate the several links 139 which in turn cause turning movement of the sleeves 133. The sleeves 133 transmit turning movement to the rods or stems 136 so that the enlargements 137 are threaded up or down in the sockets 132. This increases or decreases the stroke of the several intake valves 11a.

In the operation of the above disclosed embodiments of the invention the corresponding units or elements operate in the same manner. Referring particularly to the engine structure illustrated in Figs. 1 to 6, inclusive, of the drawings, the engine operates generally in the usual manner. The fuel injecting means operates to supply charges of the fuel under pressure to the nozzles 83 or 102 in a given time relation to the operation of the valves 11 so that sprays of the atomized or vaporized fuel are directed toward the valves. The valves 11 are operated by the valve operating mechanism to admit the charges of fuel and air to the combustion chambers or cylinders 17 and the charges when ignited by the ignition system 13 drive the pistons 18 down. The engine operation may be governed solely by the lever 53 or 53a as the case may be. Operation of this control lever simultaneously regulates the ignition system 13, the cooling system 14, the fuel injecting means and the operating means of the intake valves 11. The simultaneous regulation or control of the ignition system, cooling system, fuel injecting means and intake and throttling valves 11 provides for the most efficient and effective engine operation.

Considering the action of the various elements more particularly it will be observed that the air is at all times freely admitted to the manifold 73 but that the air is segregated from the fuel until it is diverted into the intake valve chambers 20 by the inductive action of the pistons 18 moving downwardly in the cylinders 17. This segregation of the air and fuel delays the preparation of the air and fuel mixture and shortens the travel of the fuel and air mixture to reduce condensation of the fuel. The fuel atomizing nozzles 83 and 102 are mounted in the manifold chambers 75 which directly join the valve chambers 20 and are directed to discharge centrally through the Venturi restrictions 78 into the chambers 20. The nozzles 83 or 102 open under internal pressure and the liquid fuel is delivered to the nozzles by the injection pump means which supply the fuel to the nozzles at a known and fixed pressure but in regulable quantities. This is important as it assures the correct atomization and vaporization of the fuel and the necessary induction of the air under all load and speed conditions.

It is to be particularly noted that the means 15 is controlled to vary the rotative position of the eccentrics 46 and thus vary the stroke of the intake valves 11. The valves 11 thus governed by the means 15 act as the throttling elements for controlling the amounts of air admitted to the cylinders 17. This increases the efficiency and causes the flow of the air and the air and fuel mixture to enter the cylinders with accelerated velocity. By regulating the position of the eccentrics 46 the valves 11 are made to open later and close earlier, or vice versa, as more or less air is to be admitted to the cylinders 17. The action of the valves 11 is related to the timing and action of the fuel injecting means to provide an entirely novel and particularly effective engine control action. The fuel injecting pump means is timed and related to the action of the valves 11 so that the fuel and air mixture is prepared and admitted to the cylinder 17 during the opening movement of the related valve 11 and terminates when the valve completes its opening movement or begins to close. During the remaining valve movement, that is, during the closing of the valve 11 air continues to flow into the cylinder 17 through the manifold and the passage 20 but this air admission follows the fuel charge admission. This assures a turbulence in the fuel in a vaporized condition in the cylinder. Under all load conditions of the engine the preparation of the fuel charges and the delivery of the fuel to the valve chambers 20 terminate when the valves 11 are in their highest or fully opened position. By regulating the stroke of the valves 11 the valves serve as throttling means for governing the admission of the fuel charges to the cylinders 17 and serve to maintain a suitable richness of the fuel mixture under all load conditions by limiting the admission of the air which would otherwise tend to dilute the fuel and air mixture. By limiting the time the intake valves 11 remain open the amount of air admitted to the cylinders 17 is reduced.

The control means 15 of the invention governs the ignition system 13 to assure the most effective combustion with relation to the quantities of the fuel charges admitted to the cylinders. The means 15 synchronized with the control elements of the valves 11 and the fuel injecting means adjusts the temperature of firing of the fuel charges. This is essential for the successful operation of an engine employing a low grade of fuel. The control means 15 operates the valve 62 in a given relation to the control of the valves 11, the ignition system 13 and the fuel injecting means to maintain a most desirable engine temperature under all operating conditions. The valve 62 deflects more or less of the outgoing heated water from the engine to the suction side of the pump 63 for recirculation through the head and block assembly. By varying the quantity of the heated water thus by-passed back into the engine the temperature of the engine is controlled. As the valve 62 is operated by the means 15 simultaneously with and in a given relation to the means for adjusting the valves 11 the means for regulating the fuel injecting means and the means of regulating the ignition system 13, the engine temperature is made ideal for all speed and load conditions.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In an internal combustion engine having a cylinder with an intake port for the cylinder, the combination of a valve controlling said port, means for operating the valve, means admitting air to the port, means for injecting fuel charges into the port in synchronism with the valve operations to mix with and entrain the air, ignition means operating in timed relation to the valve operations for firing the charges in the cylinder, a regulable cooling system, and a control for simultaneously regulating the valve operating means, the injecting means, the ignition means and the cooling system.

2. In an internal combustion engine having a combustion chamber and an intake port joining the combustion chamber, the combination of an intake valve governing the intake port, regulable means for operating the valve, an intake manifold having a Venturi opening communicating with the port to supply air thereto, a fuel injecting nozzle discharging in the manifold and directed to discharge its spray through the Venturi opening and into the port whereby the port forms a chamber in which the fuel and air are mixed, regulable means for supplying charges of fuel under pressure to the nozzle during the opening movements of the valve, a regulable ignition system, a regulable cooling system for the engine, means operatively interconnecting the regulable valve operating means, the regulable fuel injecting means, the regulable ignition system and the regulable cooling system for simultaneous regulation, and means for operating the interconnecting means to effect such simultaneous regulation.

PAUL L. JOSLYN.